United States Patent Office 2,719,845
Patented Oct. 4, 1955

2,719,845
ISOLATION OF SAPOGENINS

Monroe E. Wall, Oreland, Pa., assignor to the United States of America as represented by the Secretary of Agriculture No Drawing. Application December 2, 1952, Serial No. 323,735

3 Claims. (Cl. 260—239.55)

(Granted under Title 35, U. S. Code (1952), sec. 266)

A non-exclusive, irrevocable, royalty-free license in the invention herein described for all governmental purposes, throughout the world, with power to grant sub-licenses for such purposes, is hereby granted to the Government of the United States of America.

This invention relates to steroidal sapogenins and to processes for their isolation and purification. An object of this invention is to provide a process for recovering relatively pure steroidal sapogenins, or chemical derivatives thereof, from plant tissues containing them, or from crude products from steroidal saponin-containing plant extracts, or from crude steroidal sapogenins obtained by the hydrolysis of impure steroidal saponins extracted from plant tissue.

Steroidal sapogenins occur in many plants in the form of glucosides, called steroidal saponins, and can be obtained therefrom by extracting and hydrolyzing the saponins. In the usual steroidal saponin extraction processes the extracted steroidal saponins are heavily contaminated with other plant constituents, such as chlorophyll or other pigments, fatty material, etc. Purification of the saponins is tedious and expensive.

I have now discovered a process for purifying steroidal sapogenins, particularly sarsasapogenin, hecogenin, manogenin and mixtures thereof, contained in relatively crude hydrolyzed steroidal saponin extracts or from other forms of crude steroidal sapogenins. According to my process, the crude steroidal sapogenin is acetylated by boiling it at atmospheric pressure with a substantial excess of acetic anhydride, and extracting the resulting sapogenin acetate from the excess acetic anhydride and impurities present therein by contacting the acetylation reaction mixture with a liquid hydrocarbon solvent which is a solvent for the sapogenin acetate, which is immiscible with the acetic anhydride, and which consists of at least about 80% of aliphatic hydrocarbons containing 5 to 8 carbon atoms, particularly hexane, and not more than about 20% of an aromatic hydrocarbon, particularly benzene, and separating the sapogenin acetate from the solvent. Preferably, about 5% of water is added to the acetylation reaction mixture before the latter is contacted with the hydrocarbon solvent. The isolated sapogenin acetate can thereafter be further purified, if desired, as by crystallization, adsorption, or other conventional means, or it can be utilized as such in chemical syntheses, or it can be hydrolyzed conventionally to recover the sapogenin.

The copending application entitled "Process for Extracting Saponins from Plant Tissue," filed December 2, 1952, Serial No. 323,736, describes a simple and economical process for extracting crude steroidal saponins from plants. The crude steroidal saponins obtained thereby are suitable raw material for the production of steroidal sapogenins in accordance with the present invention.

My invention is illustrated by the following examples.

Example I 5 kg. of dried yucca leaf meal were extracted with 25 l. of boiling 80% isopropanol–20% water. The solution was cooled, filtered and concentrated to 4 l. The concentrate was heated to boiling and filtered. The fatty residue was washed with hot 50% isopropanol–50% water. The combined filtrates were concentrated to 4 l. and the essentially aqueous liquor was extracted 4 times by shaking with 1 l. of butanol each time. To the combined butanol extracts 2 l. of water was added. The mixture was then reduced to 1 l. by distilling off the butanol-water azeotrope. The residue consisted of an essentially aqueous solution of crude steroidal saponins.

The steroidal saponins were hydrolyzed by adding 250 ml. of ethanol and sufficient hydrochloric acid to make the solution 2-normal in acid. The acidic solution was refluxed 3 hours, cooled and filtered. The crude steroidal sapogenin thus obtained was then purified by the process of the present invention as follows:

After being dried on a steam bath, the crude steroidal sapogenin was refluxed two hours with 2 l. of acetic anhydride. After being cooled the solution was extracted 3 times with hexane, 2 l. being used each time. The hexane layers were separated from the thick, tar-like acetic anhydride layer, combined, and washed, first with 5% sodium bicarbonate solution, then with water. The hexane solution was then evaporated to dryness and the crude steroidal sapogenin acetate was recrystallized from methanol to yield 50 g. of substantially pure sarsasapogenin acetate. The free sarsasapogenin was readily obtainable by conventional hydrolysis of the acetate.

Example II

The crude steroidal sapogenin from 40 lbs. of fresh *Agave toumeyana* leaves was obtained by the process described in Example I. It was refluxed 2 hours with 2 l. of acetic anhydride and the cooled solution was extracted 3 times, using 2 l. of hexane each time. Then 5 ml. of water was added and it was extracted 3 times more, this time with 2 l. of 80% hexane–20% benzene. The hexane and hexane-benzene layers were combined, washed with water and evaporated to dryness. The steroidal sapogenin acetate was recrystallized from methanol and yielded 36 g. of a mixture of approximately equal amounts of hecogenin acetate and manogenin acetate. The free sapogenins could be obtained by hydrolysis of the acetates.

The hexane used in the above examples was a petroleum fraction having an average of $C_6$ hydrocarbon composition. The extraction of the steroidal sapogenin acetate from the crude acetylation mixture, I have found, may be accomplished with any solvent which is a selective solvent for the steroidal sapogenin acetate and with which acetic anhydride is immiscible. Such solvents include the normally liquid hydrocarbons, particularly the aliphatic or cycloaliphatic hydrocarbons having 5 to 8 carbon atoms, as for example pentane, hexane, cyclohexane, methyl cyclohexane, octane or mixtures of such hydrocarbons. To these solvents may be added up to 20 volume percent of an aromatic hydrocarbon such as benzene or toluene. These last mentioned mixtures sometimes render the extraction more efficient. In order to separate the solvent layer more quickly and cleanly from the acetic anhydride layer, I have found it is frequently advantageous to add about 5 volume percent of water to the mixture during the extraction.

It is to be noted that I use a large excess of acetic anhydride over the theoretically required amount, this excess serving as a solvent and reaction medium. It also retains the plant pigments and other undesirable impurities in the extraction step which follows acetylation.

I claim:

1. A process for purifying a crude steroidal sapogenin selected from the group consisting of sarsasapogenin, hecogenin, manogenin and mixtures thereof, comprising acetylating the crude steroidal sapogenin by boiling it at atmospheric pressure with a substantial excess of acetic anhydride, extracting the resulting sapogenin acetate from the excess acetic anhydride and impurities present therein by contacting the acetylation reaction mixture with a liquid hydrocarbon solvent which is a solvent for the sapogenin acetate, which is immiscible with the acetic anhydride, and which consists of at least about 80% of aliphatic hydrocarbons containing 5 to 8 carbon atoms and not more than about 20% of an aromatic hydrocarbon selected from the group consisting of benzene and toluene, and separating the sapogenin acetate from said solvent.

2. The process of claim 1 wherein about 5% of water is added to the acetylation reaction mixture before the latter is contacted with the hydrocarbon solvent.

3. The process of claim 1 wherein the sapogenin acetate, separated from the solvent, is hydrolyzed to produce the substantially pure steroidal sapogenin.

References Cited in the file of this patent

UNITED STATES PATENTS

| | | |
|---|---|---|
| Re. 23,008 | Wagner | June 15, 1948 |
| 2,289,373 | Marker | July 14, 1942 |
| 2,352,852 | Marker | July 4, 1944 |
| 2,408,827 | Wagner | Oct. 8, 1946 |
| 2,408,834 | Wagner | Oct. 8, 1946 |
| 2,408,835 | Wagner | Oct. 8, 1946 |

OTHER REFERENCES

Marker, JACS, vol. 69, September 1947, pp. 2220–30.
Marker, JACS, June 1943, pp. 1199–1208.